(12) United States Patent
Suzuki (10) Patent No.: US 10,112,129 B2
(45) Date of Patent: Oct. 30, 2018

(54) MESH FILTER

(71) Applicant: ENPLAS CORPORATION, Saitama (JP)

(72) Inventor: Akihiro Suzuki, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 15/119,869

(22) PCT Filed: Feb. 10, 2015

(86) PCT No.: PCT/JP2015/053591
§ 371 (c)(1),
(2) Date: Aug. 18, 2016

(87) PCT Pub. No.: WO2015/133232
PCT Pub. Date: Sep. 11, 2015

(65) Prior Publication Data
US 2017/0056791 A1  Mar. 2, 2017

(30) Foreign Application Priority Data
Mar. 6, 2014  (JP) .................................. 2014-043501

(51) Int. Cl.
*B01D 29/01* (2006.01)
*B01D 29/05* (2006.01)
(Continued)

(52) U.S. Cl.
CPC ........... *B01D 29/012* (2013.01); *B01D 29/05* (2013.01); *B29C 45/263* (2013.01); *B29L 2031/14* (2013.01); *B29L 2031/7374* (2013.01)

(58) Field of Classification Search
CPC .... B01D 29/012; B01D 29/05; B29C 45/263; B29L 2031/14; B29L 2031/7374
(Continued)

(56) References Cited

U.S. PATENT DOCUMENTS 4,773,990 A * 9/1988 Hood, Jr. ............. B01D 29/072
210/314

FOREIGN PATENT DOCUMENTS

DE  102004002963 A1 * 1/2005 ......... B29C 45/0046
JP  60-31319  3/1985
(Continued)

OTHER PUBLICATIONS

DE102004002963—machine translation.*
International Search Report dated Mar. 31, 2015 in International (PCT) Application No. PCT/JP2015/053591.

*Primary Examiner* — Madeline Gonzalez
(74) *Attorney, Agent, or Firm* — Wenderoth, Lind & Ponack, L.L.P.

(57) ABSTRACT

A filter unit connecting a gate connection part to an outer cylinder includes a plurality of longitudinal ribs formed at regular intervals orthogonally to an X axis and parallel to a Y axis when a virtual plane orthogonal to a central axis of the gate connection part is assumed to be an X-Y plane. A plurality of transverse ribs is formed at regular intervals orthogonally to the longitudinal ribs and parallel to the X axis, and a plurality of rectangular openings is formed between the longitudinal ribs and the transverse ribs. By injecting molten resin into a cavity from a gate opened toward a cavity portion forming the gate connection part, the gate connection part, the outer cylinder, and the filter unit are formed integrally, the rib widths of the longitudinal ribs and the transverse ribs are made constant, and the shapes of the plurality of openings are made identical.

2 Claims, 8 Drawing Sheets (51) Int. Cl.
*B29C 45/26* (2006.01)
*B29L 31/14* (2006.01)
*B29L 31/00* (2006.01)

(58) Field of Classification Search
USPC ....... 210/400, 471, 438, 162–166, 439, 437, 210/DIG. 17, 499
See application file for complete search history.

(56) References Cited

FOREIGN PATENT DOCUMENTS

| | | |
|---|---|---|
| JP | 5-44204 | 6/1993 |
| JP | 7-100317 | 4/1995 |
| JP | 7-137166 | 5/1995 |
| JP | 7-156156 | 6/1995 |
| JP | 7-300889 | 11/1995 |
| JP | 9-1690 | 1/1997 |
| JP | 2007-1232 | 1/2007 |

* cited by examiner

MESH FILTER

TECHNICAL FIELD

The present invention relates to a mesh filter used to filter out foreign matter in fluid, more specifically to a mesh filter molded integrally by injection molding.

BACKGROUND ART

A mesh filter is installed in an intermediate point of, for example, a fuel supply tube connected to the fuel injection apparatus of an automobile or an oil pipe of a lubrication apparatus or the like to filter out foreign matter in fluid such as fuel or oil using the mesh filter.

First Conventional Example

Figure 7A:
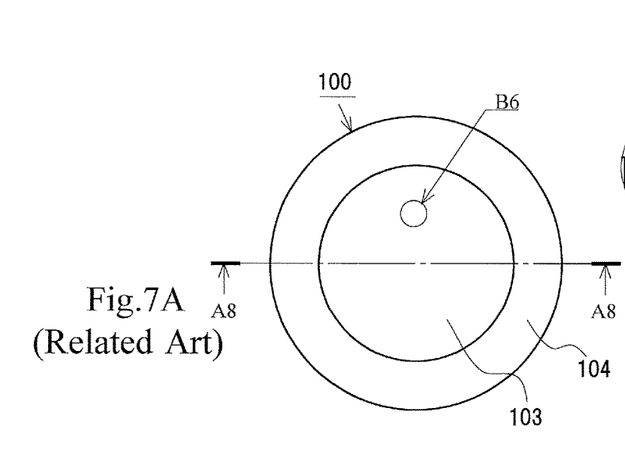
FIG. 7A is a plan view illustrating the mesh filter according to the first conventional example.
Figure 7B:
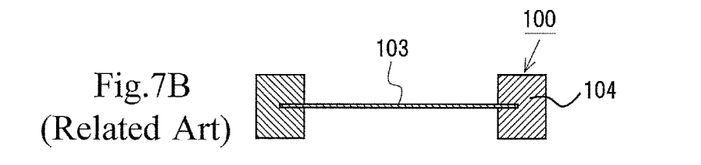
FIG. 7B is a cross sectional view taken along line A8-A8 in FIG. 7A.
Figure 7C:
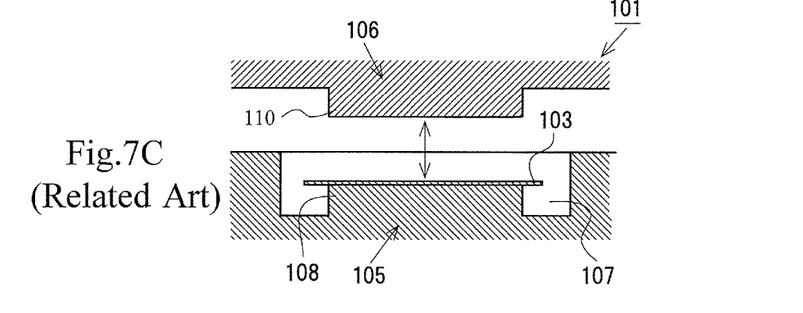
FIG. 7C is a cross sectional view of the metal mold illustrating a first stage in a molding method for the mesh filter according to the first conventional example.
Figure 7D:
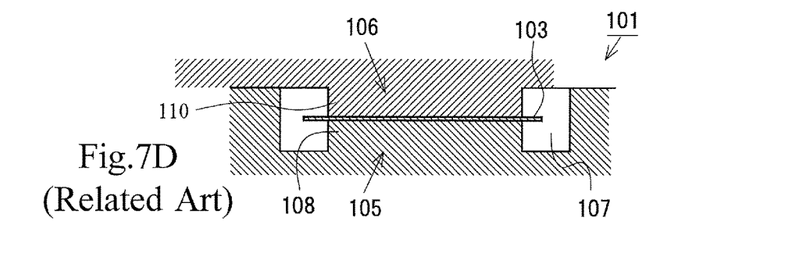
FIG. 7D is a cross sectional view of the metal mold illustrating a second stage in the molding method for the mesh filter according to the first conventional example.
Figure 7E:
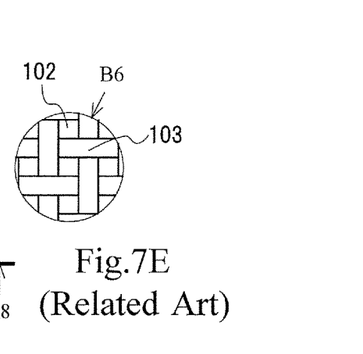
FIG. 7E is an enlarged view of part B6 in FIG. 7A.
Figure 8A:
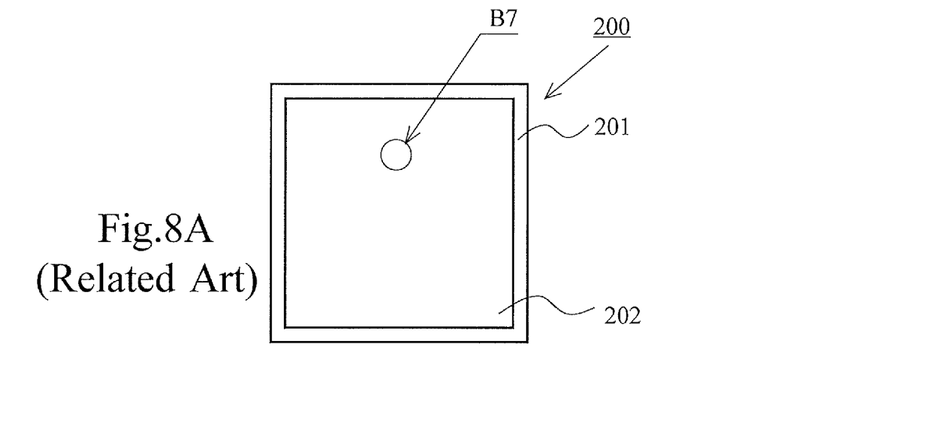
FIG. 8A is a plan view illustrating the mesh filer according to the second conventional example.
Figure 8B:
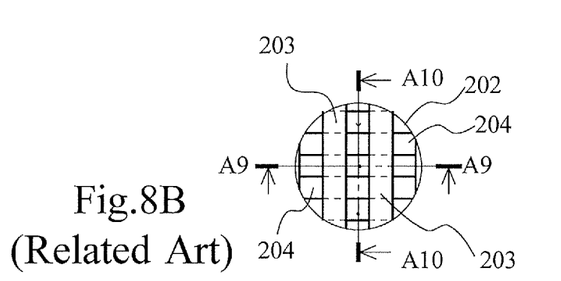
FIG. 8B is an enlarged view illustrating part B7 in FIG. 8A.
Figure 8C:
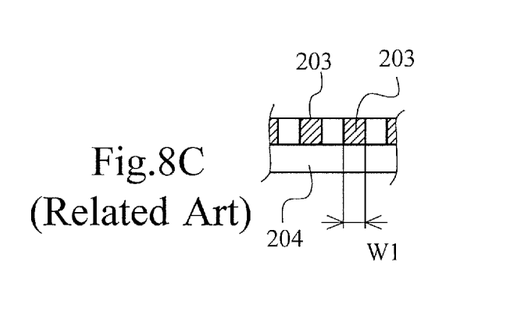
FIG. 8C is a cross sectional view taken along line A9-A9 in FIG. 8B.
Figure 8D:
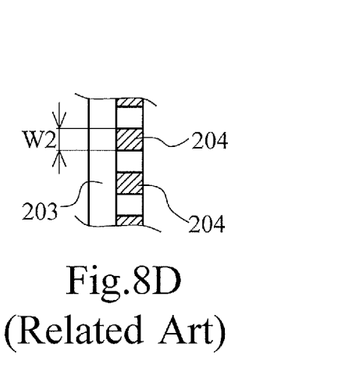
FIG. 8D is a cross sectional view taken along line A10-A10 in FIG. 8B.

FIGS. 7A-7E illustrate a mesh filter 100 according to a first conventional example. FIG. 7A is a plan view illustrating the mesh filter 100 according to the first conventional example, and FIG. 7B is a cross sectional view illustrating the mesh filter 100 taken along line A8-A8 in FIG. 7A. FIG. 7C is a cross sectional view of a metal mold 101 illustrating a first stage in a molding method for the mesh filter 100 according to the first conventional example, FIG. 7D is a cross sectional view of the metal mold 101 illustrating a second stage in the molding method for the mesh filter 100 according to the first conventional example, and FIG. 7E is an enlarged view of part B6 in FIG. 7A.

The mesh filter 100 according to the first conventional example illustrated in FIGS. 7A-7E includes a mesh member 103 having many openings 102 (for example, square openings of 0.1 mm×0.1 mm) that passes oil and filters out foreign matter (such as metal powder or dust) with a predetermined size (for example, a diameter of 0.1 mm), and a resinous frame member 104 attached along the peripheral edge of the mesh member 103 (see FIGS. 7A and 7B). This mesh filter 100 is formed by stretching the mesh member 103 over the frame member 104 (see FIGS. 7A, 7B, and 7E).

The mesh filter 100 according to the first conventional example as described above is insertion-molded as illustrated in FIGS. 7C and 7D. First, in the state in which a first metal mold 105 and a second metal mold 106 are opened, the mesh member 103 is disposed on a base 108 in a cavity 107 of the first metal mold 105 (FIG. 7C). Next, the second metal mold 106 is pushed against the first metal mold 105 (the first metal mold 105 and the second metal mold 106 are closed), and the mesh member 103 is sandwiched between a pressing part 110 of the second metal mold 106 and the base 108 of the first metal mold 105. The cavity 107 for shaping the frame member 104 is formed in the parts of the first metal mold 105 and the second metal mold 106 close to the mold contact surface, molten resin is injected from a gate (not illustrated) into the cavity 107 (see FIG. 7D), and the resinous frame member 104 is formed integrally along the peripheral edge of the mesh member 103.

However, since the mesh filter 100 according to the first conventional example is manufactured by insertion molding, manufacturing man-hours are increased as compared with the case in which the entire body is integrally molded by injection molding since the process for accommodating the mesh member 103 in a predetermined position in the cavity 107 is necessary.

Second Conventional Art

FIGS. 8A-8D illustrate a mesh filter 200 according to a second conventional example illustrating the mesh filter 200 having been injection-molded. Since the mesh filter 200 illustrated in FIGS. 8A-8D has a frame body part 201 and a filter unit 202 formed integrally by injection molding, the problem of the mesh filter 100 according to the first conventional example is not caused.

However, in the mesh filter 200 shown in FIGS. 8A-8D, the ratio of a rib width (W1) of a longitudinal rib 203 to a rib width (W2) of a transverse rib 204 is 2 (for example, W1/W2=2), or the rib spacing of the transverse rib 204 becomes large or small with respect to the rib spacing (small) of the longitudinal rib 203. Accordingly, in the mesh filter 200 according to the second conventional art, when the ratio of the rib width (W1) of the longitudinal rib 203 to the rib width (W2) of the transverse rib 204 is 2 (for example, W1/W2=2), the opening area of the filter unit 202 is small as compared with the mesh filter 200 in which the rib width of the longitudinal rib 203 is the same as the rib width of the transverse rib 204 (W=W2). Therefore, the pressure loss of fluid passing through the filter unit 202 is large, thereby causing reduction in the filter performance. On the other hand, in the mesh filter 200 shown in FIGS. 8A-8D in which the rib spacing of the transverse ribs 204 becomes large or small with respect to the rib spacing (small) of the longitudinal ribs 203, variations are caused in the shape and opening area of the opening portion of the filter unit 202, so foreign matter having sizes to be removed cannot be filtered out, thereby causing reduction in the filter performance.

SUMMARY OF THE INVENTION

An object of the invention is to provide an injection-molded mesh filter that improves the productivity and reduces the product cost while maintaining requested filter performance.

Solution to Problem

As illustrated in FIGS. 1 to 6, a mesh filter 1 according to the invention is used to filter out foreign matter in fluid. The mesh filter 1 according to the invention includes a disc-shaped (discoid) gate connection part 2 in which a gate 6 for injection molding is disposed, an outer cylinder 3 surrounding the gate connection part 2, a filter unit 4 connecting an outer peripheral surface 2a of the gate connection part 2 to an inner peripheral surface 3a of the outer cylinder 3 along a radial direction of the gate connection part 2. When a virtual plane orthogonal to a central axis 5 of the gate connection part 2 is assumed to be an X-Y plane, the filter unit 4 is formed along the X-Y plane. The filter unit 4 except a connection portion connecting to the gate connection part 2 and a connection portion connecting to the outer cylinder 3 includes a plurality of longitudinal ribs 8 formed at regular intervals parallel to each other along the X-Y plane, a plurality of transverse ribs 10 formed at regular intervals parallel to each other along the X-Y plane. The transverse ribs 10 cross the plurality of longitudinal ribs 8, and a plurality of openings 11 are formed between the plurality of longitudinal ribs 8 and the plurality of transverse ribs 10. Molten resin is injected from the gate 6 opened toward a cavity portion (first cavity portion 16) shaping the gate connection part 2 of a cavity 15 of a metal mold 7 into the cavity portion to form the gate connection part 2, the outer cylinder 3, and the filter unit 4 integrally (i.e., one piece), make rib widths L2 and L3 of the longitudinal ribs 8 and the transverse ribs 10 constant (uniform), and make the shapes of the openings 11 identical.

Advantageous Effects of Invention

According to the invention, it is possible to integrally mold the entire mesh filter using injection molding, improve the productivity of the mesh filter, and reduce the product cost of the mesh filter while maintaining requested filter performance.

BRIEF DESCRIPTION OF THE DRAWINGS

FIGS. 1A-1D illustrate a mesh filter according to a first embodiment of the invention, in which

FIGS. 2A-2D are detail views of the first embodiment, in which

FIGS. 3A-3D illustrate a metal mold used for injection molding of the mesh filter according to the first embodiment of the invention, in which

FIGS. 4A-4G illustrate a mesh filter according to a second embodiment of the invention, in which

FIGS. 5A-5E illustrate a metal mold used for the injection molding of the mesh filter according to the second embodiment of the invention, in which

FIGS. 6A-6C illustrate a mesh filter according to another embodiment of the invention, in which

FIGS. 7A-7D illustrate a mesh filter according to the first conventional example, in which

FIGS. 8A-8D illustrate a mesh filer according to the second conventional example, in which

DETAIL DESCRIPTION OF THE INVENTION

Embodiments of the invention will be described in detail below with reference to the drawings.

First Embodiment

FIGS. 1 and 2 illustrate a mesh filter 1 according to a first embodiment of the invention. FIG. 1A is a front view illustrating the mesh filter 1, FIG. 1B is a side view illustrating the mesh filter 1, FIG. 1C is a back view illustrating the mesh filter 1, and FIG. 1D is a cross sectional view illustrating the mesh filter 1 taken along line A1-A1 in FIG. 1A. In addition, FIG. 2A is an enlarged view (enlarged view of a part of the mesh filter 1) of part B1 in FIG. 1A, FIG. 2B is a cross sectional view (enlarged view of a part of the mesh filter 1) taken along line A2-A2 in FIG. 2A, FIG. 2C is a cross sectional view (enlarged cross sectional view of a part of the mesh filter 1) taken along line A3-A3 in FIG. 2A, and FIG. 2D is an enlarged view (enlarged cross sectional view of a part of the mesh filter 1) of part B2 in FIG. 1C.

As illustrated in FIGS. 1 and 2, the mesh filter 1 integrally has a discoid gate connection part 2, a cylindrical outer cylinder 3 (outer frame body), concentric with a central axis 5 of the gate connection part 2 and positioned so as to surround the gate connection part 2, and a filter unit 4 connecting an outer peripheral surface 2a of the gate connection part 2 with an inner peripheral surface 3a of an outer cylinder 3 along the radial direction. The entire mesh filter 1 is integrally formed (i.e., has a one-piece construction) by resin (such as POM (polyacetal, for example, M450-44) or nylon 66). This mesh filter 1 is disposed in, for example, a fuel supply tube connected to the fuel injection apparatus of an automobile, and the outer cylinder 3 is installed in the fuel (fluid) supply conduit or the like via a seal member (not illustrated) to prevent the leakage of fuel (fluid) flowing through the filter unit 4.

Figure 1A:
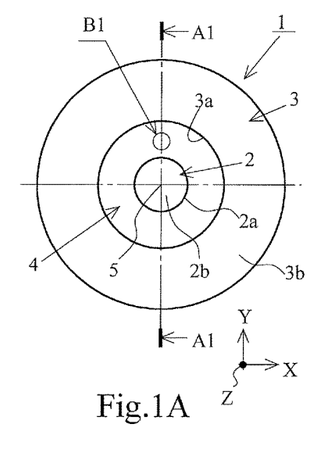
FIG. 1A is a front view illustrating the mesh filter.
Figure 1B:
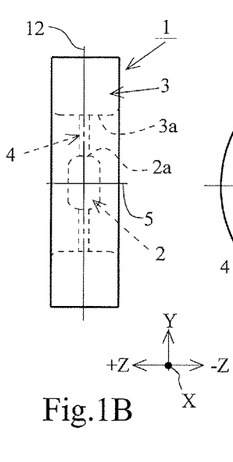
FIG. 1B is a side view illustrating the mesh filter.
Figure 1C:
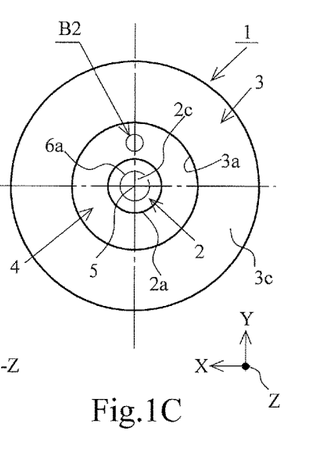
FIG. 1C is a back view illustrating the mesh filter.
Figure 1D:
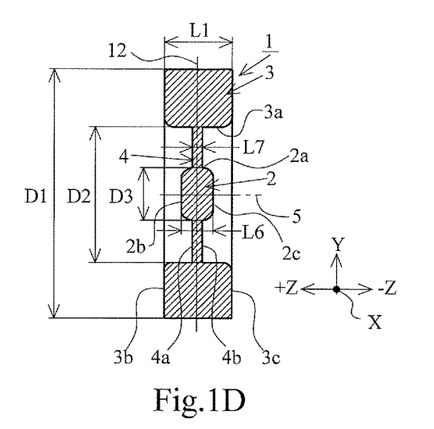
FIG. 1D is a cross sectional view illustrating the mesh filter taken along line A1-A1 in FIG. 1A.
Figure 2A:
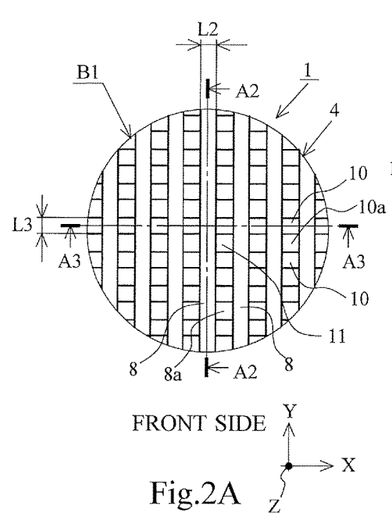
FIG. 2A is an enlarged view of part B1 in FIG. 1A.
Figure 2B:
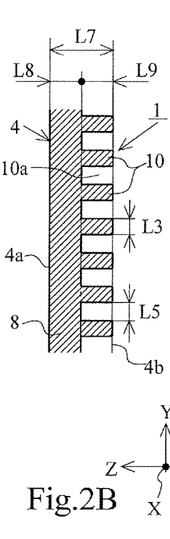
FIG. 2B is a cross sectional view taken along line A2-A2 in FIG. 2A.
Figure 2C:
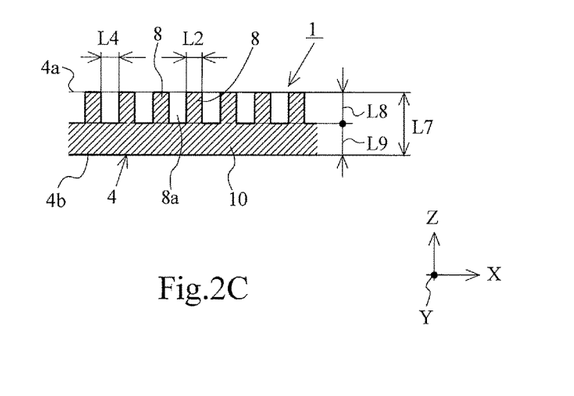
FIG. 2C is a cross sectional view taken along line A3-A3 in FIG. 2A.
Figure 2D:
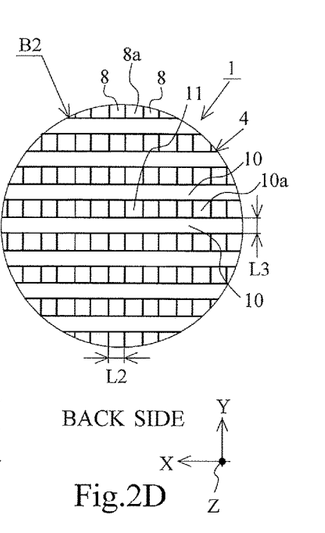
FIG. 2D is an enlarged view of part B2 in FIG. 1C.
Figures 3A, 3B, 3C, 3D:
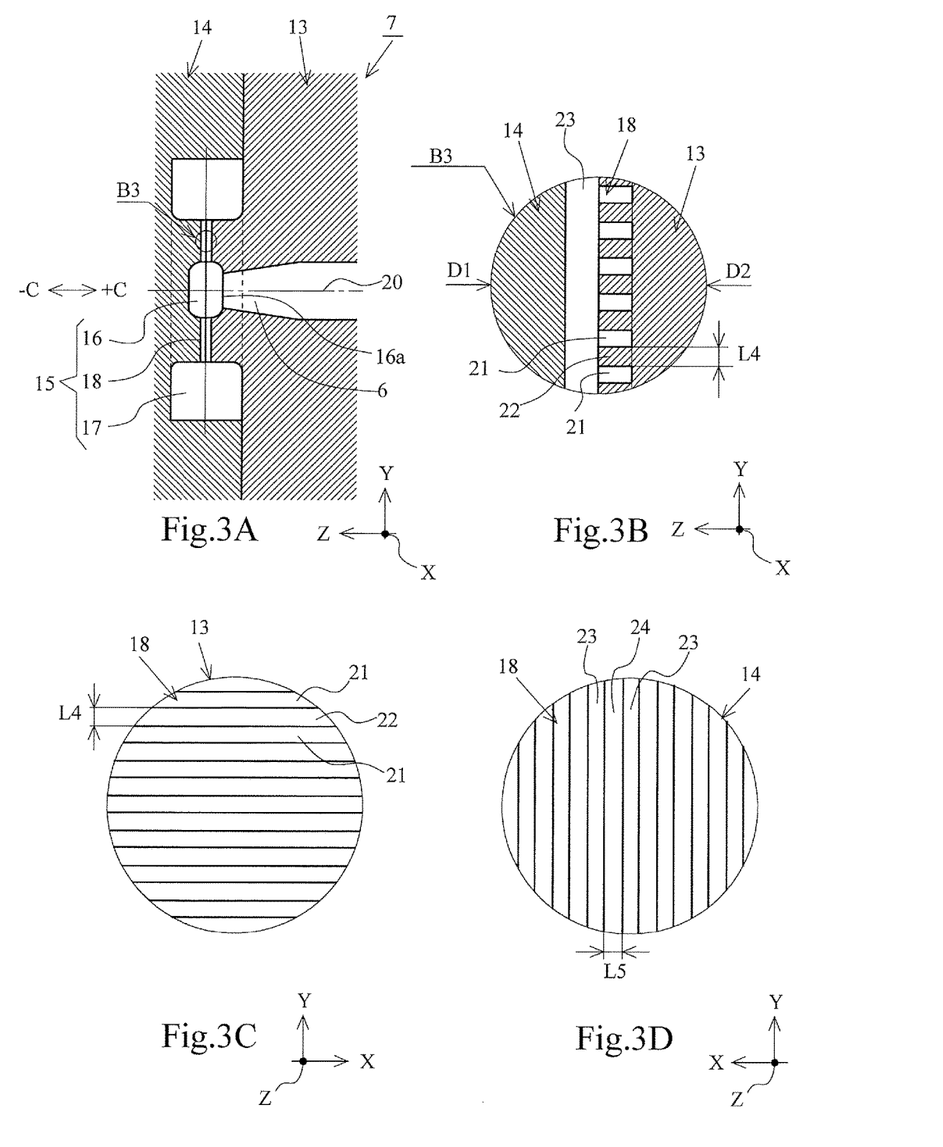
FIG. 3A is a vertical cross sectional view illustrating the metal mold.
FIG. 3B is an enlarged view of part B3 in FIG. 3A.
FIG. 3C is a plan view illustrating a part of a first metal mold seen from the direction indicated by D1 in FIG. 3B.
FIG. 3D is a plan view illustrating a part of a second metal mold seen from the direction indicated by D2 in FIG. 3B.

The gate connection part 2 is the portion toward which a gate 6 for injection molding is opened, and the gate connection part 2 has an outer dimension equal to or more than the inner diameter of the opening of the gate 6 (see a gate mark 6a in FIGS. 1C and 3A). In addition, since the gate connection part 2 is cut off from the gate 6 for injection molding before removal of the mesh filter 1 as a product from a metal mold 7 after injection molding, the gate connection part 2 has a wall thickness thick enough to prevent breakage by the force applied during cutting off from the gate (see FIGS. 3A-3D). A front surface 2b of the gate connection part 2 projects in a direction (+Z axis direction) along the central axis 5 from a front surface 4a of the filter unit 4. In addition, a back surface 2c of the gate connection part 2 projects from a back surface 4b of the filter unit 4 in a direction (−Z axis direction) along the central axis 5.

The outer cylinder 3 has a front surface 3b projecting along the central axis 5 (+Z axis direction) from the front surface 2b of the gate connection part 2 and a back surface 3c projecting along the central axis 5 (−Z axis direction) from the back surface 2c of the gate connection part 2. As such, a length of the discoid gate connection part 2 along a central axis 5 of the discoid gate connection part 2 is smaller than a length of the outer cylinder 3 along a central axis 5 of the outer cylinder 3, and the length of the discoid gate connection part 2 is greater than a length of the filter unit 4 along a central axis of the filter unit 4 (see, e.g., FIG. 1D). The outer cylinder 3 accommodates the filter unit 4 and the gate connection part 2 on the radially inward side. The shape of the outer cylinder 3 is changed (to a width across flat shape or hexagonal shape, for example) as appropriate depending on the attachment part structure of the member (such as the supply conduit of control oil for a hydraulic control apparatus or the like) to which the mesh filter 1 is attached.

When the virtual plane orthogonal to the central axis 5 of the gate connection part 2 is assumed to be an X-Y plane, the filter unit 4 is formed along the X-Y plane. On the front surface 4a of the filter unit 4, a plurality of longitudinal ribs 8 extending orthogonally to the X axis and along the Y axis are formed at regular intervals parallel to the Y axis. In addition, on the back surface 4b of the filter unit 4, a plurality of transverse ribs 10 extending orthogonally to the longitudinal ribs 8 and along the X axis are formed at regular intervals parallel to the X axis. In plan view of the filter unit 4, the filter unit 4 except the connection portion connecting to the gate connection part 2 and the connection portion connecting to the outer cylinder 3 has square openings 11 between the longitudinal ribs 8 and 8 adjacent to each other and the transverse ribs 10 and 10 adjacent to each other. That is, the opening 11 is formed at the crossing portion of a longitudinal groove 8a between the longitudinal ribs 8 and 8 adjacent to each other and a transverse groove 10a between the transverse ribs 10 and 10 adjacent to each other and the number of openings 11 is the same (two or more) as the number of crossing portions of the longitudinal grooves 8a and the transverse grooves 10a. In addition, a rib width L2 of the longitudinal rib 8 is the same as a rib width L3 of the transverse rib 10 (L2=L3). In addition, a groove width L4 of the longitudinal groove 8a is the same as a groove width L5 of the transverse groove 10a (L4=L5). Accordingly, the shapes of the plurality of the openings 11 are identical in plan view (squares having the same opening area).

Although the mesh filter 1 is symmetric with respect to a width direction central line 12 of the outer cylinder 3 in FIG. 1B, the filter unit 4 and the gate connection part 2 may be displaced along the central axis 5 (the +z axis direction or the −z axis direction) with respect to the width direction central line 12. In addition, in the mesh filter 1, in FIG. 1B, one of the filter unit 4 and the gate connection part 2 may be displaced along the central axis 5 (the +z axis direction or the −z axis direction) with respect to the width direction central line 12 of the outer cylinder 3. In addition, in the filter unit 4, the plurality of longitudinal ribs 8 may be formed on the back surface 4b and the plurality of transverse ribs 10 may be formed on the front surface 4a.

Example

Next, an example of the mesh filter 1 will be described to facilitate the understanding of the mesh filter 1 according to the embodiment. For example, the mesh filter 1 is formed so that an outer diameter D1 of the outer cylinder 3 is 7.0 mm, a width (the length along the central axis 5) L1 of the outer cylinder 3 is 2 mm, an inner diameter D2 of the outer cylinder 3 is 4 mm, an outer diameter D3 of the gate connection part 2 is 1.5 mm, and a width (the length along the central axis 5) L6 of the gate connection part 2 is 0.9 mm. In addition, the mesh filter 1 is formed so that the rib width L2 of the longitudinal rib 8 and the rib width L3 of the transverse rib 10 are 0.07 mm, a groove width L4 of the longitudinal groove 8a and a groove width L5 of the transverse groove 10a are 0.077 mm, and the one side of the square opening 11 is 0.077 mm. In addition, the mesh filter 1 is formed so that a total wall thickness L7 of the filter unit 4 is 0.3 mm, and a wall thickness (the dimension along the Z axis) L8 of the longitudinal rib 8 is 0.15 mm, a wall thickness (the dimension along the Z axis) L9 of the transverse rib 10 is 0.15 mm. In addition, the gate inner diameter (the diameter of the gate mark 6a) is 0.8 mm. These values in this example of the mesh filter 1 are provided to facilitate the understanding of the mesh filter 1 according to the embodiment as described above and do not limit the mesh filter 1 according to the embodiment, so these values are changed depending on the use conditions and the like.

FIG. 3 illustrates the metal mold 7 used for injection molding of the mesh filter 1 according to the embodiment. In FIGS. 3A-3D, FIG. 3A is a vertical cross sectional view illustrating the metal mold 7, FIG. 3B is an enlarged view (enlarged cross sectional view of a part of the metal mold 7) illustrating part B3 in FIG. 3A, FIG. 3C is a plan view of a part of a first metal mold 13 seen from the direction indicated by D1 in FIG. 3B, and FIG. 3D is a plan view of a part of a second metal mold 14 seen from the direction indicated by D2 in FIG. 3B.

As illustrated in FIG. 3A, the metal mold 7 is provided with a cavity 15 for injection molding of the mesh filter 1 in the part close to the mold contact surface of the first metal mold 13 and the second metal mold 14. The cavity 15 includes a discoid first cavity portion 16 for shaping the gate connection part 2 of the mesh filter 1, a cylindrical second cavity portion 17 for shaping the outer cylinder 3 of the mesh filter 1, and a hollow discoid third cavity portion 18 for shaping the filter unit 4 of the mesh filter 1. In addition, the first metal mold 13 has, at the center of the first cavity portion 16, the gate 6 opened in one end surface 16a in a direction along a central axis 20 of the first cavity portion 16 (see the gate mark 6a in FIG. 1C). In addition, in the portion of the first metal mold 13 for forming the third cavity portion 18, a plurality of transverse rib grooves 21 (as many transverse rib grooves 21 as the transverse ribs 10) for forming the transverse ribs 10 are formed at regular (uniform) intervals (see FIGS. 3B to 3C). The transverse rib groove 21 has a rectangular cross section and has a constant groove width along the X axis direction. In addition, an inter-transverse rib groove projection 22 for shaping the transverse groove 10a is formed between the transverse rib grooves 21 and 21 adjacent to each other. The inter-transverse rib groove projection 22 has a rectangular cross section and has the constant projection width L4 along the X axis direction (see FIGS. 3B to 3C). In addition, the portion of the second metal mold 14 for forming the third cavity portion 18 is provided with a plurality of longitudinal rib grooves 23 (as many longitudinal rib grooves 23 as the longitudinal ribs 8) for shaping the longitudinal ribs 8 at regular intervals (see FIGS. 3B and 3D). The longitudinal rib groove 23 has a rectangular cross section and has a constant groove width (the same groove width as in the transverse rib groove 21) along the Y axis direction. In addition, an inter-longitudinal rib groove projection 24 for forming the longitudinal groove 8a is formed between the longitudinal rib grooves 23 and 23 adjacent to each other. The inter-longitudinal groove projection 24 has a rectangular cross section having the same dimensions as in the inter-transverse rib groove projection 22 and the inter-longitudinal groove projection 24 has the constant projection width L5 (=L4) along the Y axis direction.

In the metal mold 7, when the first metal mold 13 and the second metal mold 14 are closed, the inter-transverse rib groove projection 22 of the first metal mold 13 and the inter-longitudinal rib groove projection 24 of the second metal mold 14 abut against each other so as to cross crisscross. Accordingly, even when molten resin is injected into the cavity 15, the molten resin is not supplied to the crossing portion at which the inter-transverse rib groove projection 22 of the first metal mold 13 and the inter-longitudinal rib groove projection 24 of the second metal mold 14 cross each other and the crossing portion at which the inter-transverse rib groove projection 22 of the first metal mold 13 and the inter-longitudinal rib groove projection 24 of the second metal mold 14 cross each other is formed into the square opening 11. Accordingly, one side of the square opening 11 equals the projection width L4 of the inter-transverse rib groove projection 22 and the projection width L5 of the inter-longitudinal rib groove projection 24 (L4=L5). Although only one gate 6 opened toward the cavity 15 is provided at the center of the first cavity portion 16 in the embodiment, the invention is not limited to the embodiment and the gates 6 may be provided in two or more positions according to the outer dimensions and the like of the first cavity portion 16.

In the metal mold 7 having such a structure, as illustrated in FIG. 3A, after molten resin is injected from the gate 6 into the cavity 15 in the state in which the first metal mold 13 and the second metal mold 14 are closed, the pressure in the cavity 15 is kept at a predetermined value, and the metal mold 7 is cooled. After that, the gate 6 is cut off from the injection-molded article (mesh filter 1) in the cavity 15, the second metal mold 14 is separated from the first metal mold 13 in a −C direction (the molds are opened), the mesh filter 1 in the cavity 15 is pushed out of the cavity 15 by an ejector pin (not illustrated), and the mesh filter 1, which is the injection-molded article, is removed from the metal mold 7 (see FIGS. 1 and 2). After that, in the metal mold 7, the second metal mold 14 in the open state is moved in a +C direction (direction of approaching the first metal mold 13), the second metal mold 14 is pushed against the first metal mold 13, and the first metal mold 13 and the second metal mold 14 are closed. One cycle of injection molding of the mesh filter 1 according to the embodiment is shorter than one cycle of insertion molding of the mesh filter 100 according to the first conventional example. As a result, the mesh filter 1 according to the embodiment has a one-piece construction and is improved in productivity as compared with the mesh filter 100 according to the first conventional example and reduced in product cost as compared with the mesh filter 100 according to the first conventional example.

In the mesh filter 1 according to the embodiment as described above, since the entire body (the gate connection part 2, the outer cylinder 3, and the filter unit 4) is injection-molded integrally and accurately, the productivity is improved and the product cost is reduced while maintaining the filter performance as compared with the mesh filter 100 formed by insertion molding according to the first conventional example.

In addition, since the plurality of the openings 11 of the filter unit 4 have the same shape in the mesh filter 1 according to the embodiment, if the mesh filter 1 is disposed, for example, in a fuel supply conduit connected to the fuel injection apparatus of an automobile, the foreign matter in fuel having a size exceeding the maximum width of the openings 11 can be surely filtered out, and the fuel from which the foreign matter has been removed can be drained smoothly from the openings 11. In the mesh filter 200 according to the second conventional example in which the areas of openings are not the same in an entire filter unit 202, since there are variations in the lower limit values of the diameters of foreign matter particles that can be filtered out by the filter unit 202, the foreign matter that should pass through the filter unit 202 may be filtered out or the foreign matter that should be filtered out may pass through the filter unit 202, thereby making the filter performance insufficient. However, in the mesh filter 1 according to the embodiment, there are no variations in the lower limit values of the diameters of foreign matter particles that can be filtered out, so the filter performance can be improved as compared with the case in which there are variations in the areas of openings.

In the mesh filter 1 according to the embodiment, since the rib width L2 of the longitudinal rib 8 is the same as the rib width L3 of the transverse rib 10 (L2=L3), the number of the openings 11 per unit area can be increased in the filter unit 4 as compared with the mesh filter 200 according to the second conventional example in which the rib width (W1) of a longitudinal rib 203 is twice (for example, W1/W2=2 and W2=L3) as large as the rib width (W2) of a transverse rib 204, thereby achieving an increase in the opening area of the filter unit 4. As a result, in the mesh filter 1 according to the embodiment, the pressure loss in the filter unit 4 can be reduced and the filter performance can be improved as compared with the mesh filter 200 according to the second conventional example in which the rib width (W1) of the longitudinal rib 203 is twice as large as the rib width (W2) of the transverse rib 204.

Second Embodiment

Figure 4A:
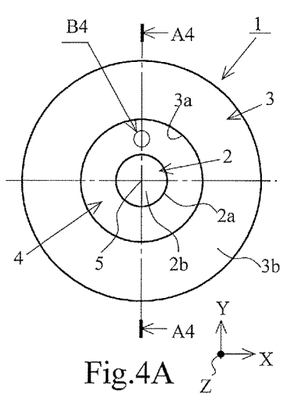
FIG. 4A is a front view illustrating the mesh filter.
Figure 4B:
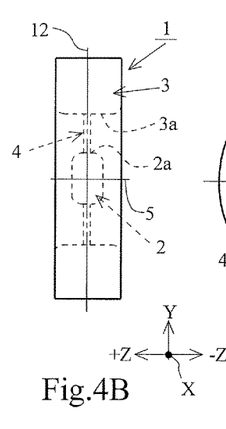
FIG. 4B is a side view illustrating the mesh filter.
Figure 4C:
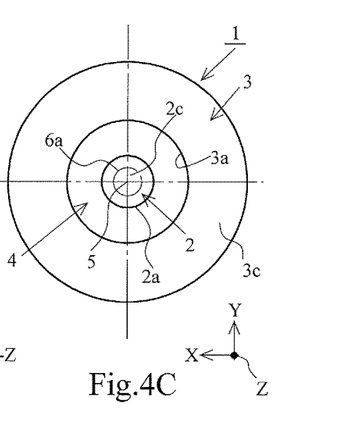
FIG. 4C is a back view illustrating the mesh filter.
Figure 4D:
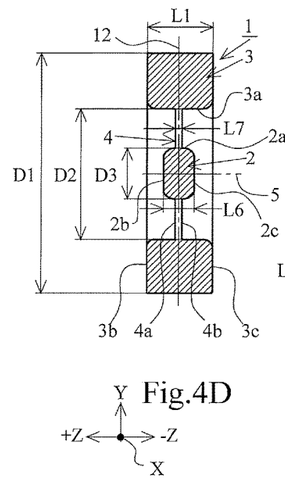
FIG. 4D is a cross sectional view illustrating the mesh filter taken along line A4-A4 in FIG. 4A.
Figure 4E:
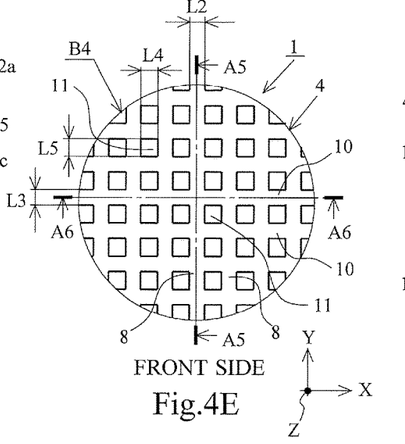
FIG. 4E is an enlarged view illustrating part B4 in FIG. 4A.
Figure 4F:
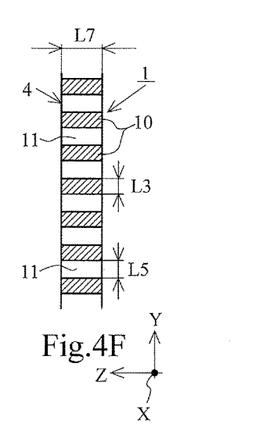
FIG. 4F is a cross sectional view taken along line A5-A5 in FIG. 4E.
Figure 4G:
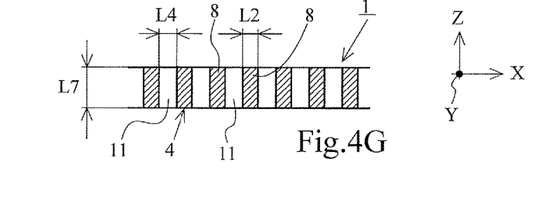
FIG. 4G is a cross sectional view taken along line A6-A6 in FIG. 4E.

FIGS. 4A-4G illustrate the mesh filter 1 according to the second embodiment of the invention. FIG. 4A is a front view illustrating the mesh filter 1, FIG. 4B is a side view illustrating the mesh filter 1, FIG. 4C is a back view illustrating the mesh filter 1, and FIG. 4D is a cross sectional view illustrating the mesh filter 1 taken along line A4-A4 in FIG. 4A. In addition, FIG. 4E is an enlarged view (enlarged view of a part of the mesh filter 1) illustrating part B4 in FIG. 4A, FIG. 4F is a cross sectional view (enlarged cross sectional view of a part of the mesh filter 1) taken along line A5-A5 in FIG. 4E, and FIG. 4G is a cross sectional view (enlarged cross sectional view of a part of the mesh filter 1) taken along line A6-A6 in FIG. 4E.

As illustrated in FIGS. 4A-4G, the mesh filter 1 integrally has the discoid gate connection part 2, the outer cylinder 3 (outer frame) positioned concentrically with the central axis 5 of the gate connection part 2 so as to surround the gate connection part 2, and the filter unit 4 connecting the outer peripheral surface 2a of the gate connection part 2 with the inner peripheral surface 3a of the outer cylinder 3 along the radial direction. The entire mesh filter 1 is integrally formed by resin (such as POM (polyacetal, for example, M450-44) or nylon 66). The mesh filter 1 according to the embodiment is disposed, as in the mesh filter 1 according to the first embodiment, in a fuel supply tube connected to the fuel injection apparatus of an automobile, and the outer cylinder 3 is attached to the fuel supply conduit or the like via a seal member (not illustrated) to prevent the leakage of fuel (fluid) flowing through the filter unit 4.

Figure 5A:
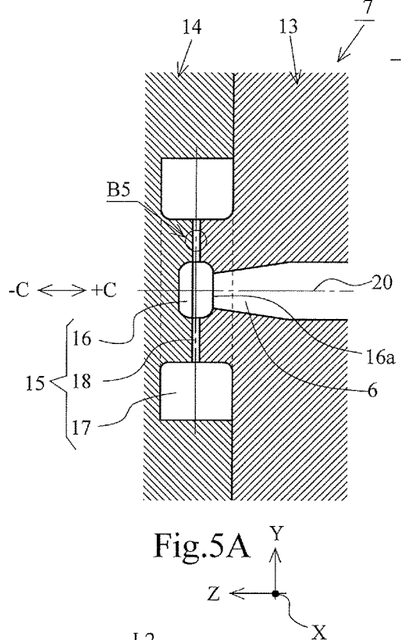
FIG. 5A is a vertical cross sectional view illustrating the metal mold.
Figure 5B:
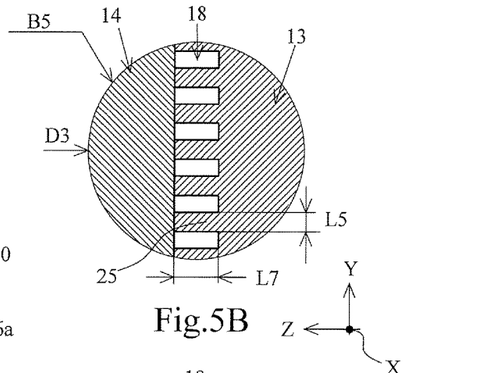
FIG. 5B is an enlarged view illustrating part B5 in FIG. 5A.
Figure 5C:
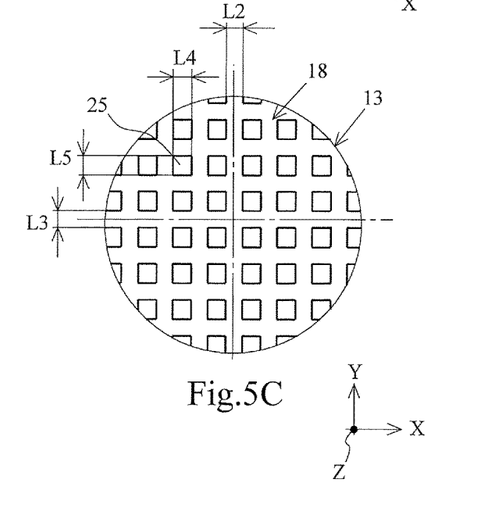
FIG. 5C is a plan view illustrating a part of the first metal mold seen from the direction indicated by D3 in FIG. 5B.

The gate connection part 2 is the portion toward which the gate 6 for injection molding is opened and has an outer dimension equal to or more than the inner diameter of the opening of the gate 6 (see the gate mark 6a in FIG. 4C and FIG. 5A). In addition, since the gate connection part 2 is cut off from the gate 6 for injection molding before removal of the mesh filter 1 as a product from the metal mold 7 after injection molding, the gate connection part 2 has a wall thickness thick enough to prevent breakage by the force applied during cutting off from the gate (see FIG. 5). The front surface 2b of the gate connection part 2 projects from the front surface 4a of the filter unit 4 in a direction (+Z axis direction) along the central axis 5. In addition, the back surface 2c of the gate connection part 2 projects from the back surface 4b of the filter unit 4 in a direction (−Z axis direction) along the central axis 5.

The outer cylinder 3 has the front surface 3b projecting along the central axis 5 (+Z axis direction) from the front surface 2b of the gate connection part 2 and the back surface 3c projecting along the central axis 5 (−Z axis direction) from the back surface 2c of the gate connection part 2. The outer cylinder 3 accommodates the filter unit 4 and the gate connection part 2 on the radially inward side. The shape of the outer cylinder 3 is changed (to a width across flat shape or hexagonal shape, for example) as appropriate depending on the attachment part structure of the member (such as the supply conduit of control oil for a hydraulic control apparatus or the like) to which the mesh filter 1 is attached.

When the virtual plane orthogonal to the central axis 5 of the gate connection part 2 is assumed to be an X-Y plane, the filter unit 4 is formed along the X-Y plane. The filter unit 4 except the connection portion connecting to the gate connection part 2 and the outer cylinder 3 is provided with the plurality of square openings 11 formed by the plurality of longitudinal ribs 8 formed at regular intervals orthogonally to the X axis and parallel to the Y axis and the plurality of transverse ribs 10 formed at regular intervals orthogonally to the longitudinal ribs 8 and parallel to the X axis. In addition, the rib width L2 of the longitudinal rib 8 is the same as the rib width L3 of the transverse rib 10 (L2=L3). In addition, the width L4 between the longitudinal ribs 8 and 8 adjacent to each other is the same as the width L5 between the transverse ribs 10 and 10 adjacent to each other (L4=L5). Accordingly, the shapes of the plurality of the openings 11 are identical in plan view (squares having the same opening area).

Although the mesh filter 1 is symmetric with respect to the width direction central line 12 of the outer cylinder 3 in FIG. 4B, the filter unit 4 and the gate connection part 2 may be displaced along the central axis 5 (the +z axis direction or the −z axis direction) with respect to the width direction central line 12. In addition, in the mesh filter 1, in FIG. 4B, one of the filter unit 4 and the gate connection part 2 may be displaced along the central axis 5 (the +z axis direction or the −z axis direction) with respect to the width direction central line 12 of the outer cylinder 3.

Example

Next, an example of the mesh filter 1 will be described to facilitate the understanding of the mesh filter 1 according to the embodiment. For example, the mesh filter 1 is formed so that the outer diameter D1 of the outer cylinder 3 is 7.0 mm, the width (the length along the central axis 5) L1 of the outer cylinder 3 is 2 mm, the inner diameter D2 of the outer cylinder 3 is 4 mm, the outer diameter D3 of the gate connection part 2 is 1.5 mm, the width (the width along the central axis 5) L6 of the gate connection part 2 is 0.9 mm. In addition, the mesh filter 1 is formed so that the rib width L2 of the longitudinal rib 8 and the rib width L3 of the transverse rib 10 are each 0.07 mm, and one side of the square opening 11 is 0.077 mm. In addition, the mesh filter 1 is formed so that the wall thickness (the dimension along the Z axis) L7 of the filter unit 4 is 0.2 mm. In addition, the inner diameter (the diameter of the gate mark 6a) of the gate is 0.8 mm. Note that the values in the example of the mesh filter 1 are indicated to facilitate the understanding of the mesh filter 1 according to the embodiment as described above and do not limit the mesh filter 1 according to the embodiment, so the values may be changed as appropriate depending on the use condition or the like.

FIG. 5 illustrates the metal mold 7 used for injection molding of the mesh filter 1 according to the embodiment. In FIG. 5, FIG. 5A is a vertical cross sectional view illustrating the metal mold 7, FIG. 5B is an enlarged view (enlarged cross sectional view of a part of the metal mold 7) of part B5 in FIG. 5A, and FIG. 5C is a plan view of a part of the first metal mold 13 seen from the direction indicated by D3 in FIG. 5B.

As illustrated in FIG. 5A, in the metal mold 7, there is the cavity 15 for injection molding of the mesh filter 1 in the parts of the first metal mold 13 and the second metal mold 14 close to the mold contact surface. The cavity 15 includes the discoid first cavity portion 16 for shaping the gate connection part 2 of the mesh filter 1, the cylindrical second cavity portion 17 for shaping the outer cylinder 3 of the mesh filter 1, and the hollow discoid third cavity portion 18 for shaping the filter unit 4 of the mesh filter 1. In addition, the first metal mold 13 has, at the center of the first cavity portion 16, the gate 6 opened toward the one end surface 16a in the direction along a central axis 20 of the first cavity portion 16 (see the gate mark 6a in FIG. 4C). The portion of the first metal mold 13 for shaping the third cavity portion 18 is provided with a plurality of projections 25 (as many projections 25 as the openings 11) for shaping the openings 11 at regular intervals (see FIGS. 5B and 5C). The projection 25 formed in the portion of the first metal mold 13 for shaping the third cavity portion 18 is square in plan view (seen from the direction indicated by D3 in FIG. 5B) and has a dimension (L4=L5) enabling the formation of the square opening 11. In addition, the projection 25 formed in the portion of the first metal mold 13 for shaping the third cavity portion 18 has a height (dimension L7 along the Z axis direction in FIG. 5B) equal to the thickness L7 of the longitudinal rib 8 and the transverse rib 10. Although only the gate 6 opened toward the cavity 15 is provided only at the center of the first cavity portion 16 in the embodiment, the invention is not limited to the embodiment and the gates 6 may be provided in two or more positions according to the outer diameter and the like of the first cavity portion 16.

As illustrated in FIG. 5A, in the metal mold 7 having such a structure, after molten resin is injected from the gate 6 into the cavity 15 in the state in which the first metal mold 13 and the second metal mold 14 are closed, the pressure in the cavity 15 is kept at a predetermined pressure, and the metal mold 7 is cooled. After that, the gate 6 is cut off from the injection-molded article (mesh filter 1) in the cavity 15, the second metal mold 14 is separated from the first metal mold 13 in the −C direction (the molds are opened), the mesh filter 1 in the cavity 15 is pushed out of the cavity 15 by an ejector pin (not illustrated), and the mesh filter 1, which is the injection-molded article, is removed from the metal mold 7 (see FIG. 4). After that, in the metal mold 7, the second metal mold 14 in the open state is moved in the +C direction (direction of approaching the first metal mold 13), the second metal mold 14 is pushed against the first metal mold 13, and the first metal mold 13 and the second metal mold 14 are closed. One cycle of injection molding of the mesh filter 1 according to the embodiment is shorter than one cycle of insertion molding of the mesh filter 100 according to the first conventional example. As a result, the mesh filter 1 according to the embodiment is improved in productivity as compared with the mesh filter 100 according to the first conventional example and reduced in the product cost as compared with the mesh filter 100 according to the first conventional example.

Figure 5D:
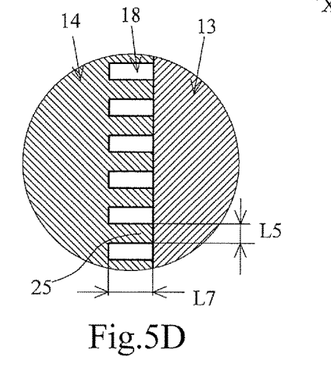
FIG. 5D is a diagram (corresponding to FIG. 5B) illustrating a first modification of a projection for forming an opening.

FIG. 5D illustrates a first modification of the projections 25 for shaping the openings 11. As illustrated in FIG. 5D, the projections 25 for shaping the openings 11 may be formed only in the portion of the second metal mold 14 for shaping the third cavity portion 18 instead of the portion of the first metal mold 13 for shaping the third cavity portion 18.

Figure 5E:
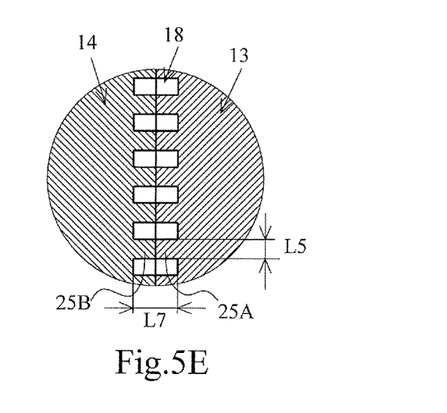
FIG. 5E is a diagram (corresponding to FIG. 5B) illustrating a second modification of the projection for forming the opening.

FIG. 5E illustrates a second modification of the projections 25 for shaping the openings 11. As illustrated in FIG. 5E, the projections 25 for shaping the openings 11 may be formed by division into two portions: the portion of the first metal mold 13 for shaping the third cavity portion 18 and the portion of the second metal mold 14 for shaping the third cavity portion 18. In the second modification, the heights of projections 25A and 25B of the first and second metal molds 13 and 14 are formed so as to become the half of the height of the projections 25 in the above second embodiment and the above first modification. When the first metal mold 13 and the second metal mold 14 are closed, the top faces of the projections 25A abut against the top faces of the projections 25B.

In the mesh filter 1 according to the embodiment as described above, since the entire body (the gate connection part 2, the outer cylinder 3, and the filter unit 4) is formed integrally and accurately by injection molding as in the mesh filter 1 according to the first embodiment, the productivity is improved and the product cost is reduced while maintaining the filter performance as compared with the mesh filter 100 formed by insertion molding according to the first conventional example.

In the mesh filter 1 according to the embodiment, the plurality of openings 11 of the filter unit 4 have the same shape as in the mesh filter 1 according to the first embodiment. Accordingly, if the mesh filter 1 is disposed in, for example, a fuel supply conduit connected to the fuel injection apparatus of an automobile, the foreign matter in fuel having a size exceeding the maximum width of the opening 11 can be surely filtered out and the fuel from which the foreign matter has been removed can be drained smoothly from the opening 11. In the mesh filter 200 according to the second conventional example in which the areas of openings are not the same in the entire filter unit 202, since there are variations in the lower limit values of the diameters of foreign matter particles that can be filtered out by the filter unit 202, the foreign matter that should pass through the filter unit 202 may be filtered out or the foreign matter that should be filtered out may pass through the filter unit 202, thereby making the filter performance insufficient. However, in the mesh filter 1 according to the embodiment, there are no variations in the lower limit values of the diameters of foreign matter particles that can be filtered out, so the filter performance can be improved as compared with the case in which there are variations in the areas of openings.

In addition, in the mesh filter 1 according to the embodiment, the rib width L2 of the longitudinal rib 8 is the same as the rib width L3 of the transverse rib 10 (L2=L3) as in the mesh filter 1 according to the first embodiment. Accordingly, as compared with the mesh filter 200 according to the second conventional example in which the rib width (W1) of the longitudinal rib 203 is twice as large as the rib width (W2) of the transverse rib 204 (for example, W1/W2=2 and W2=L3), the number of the openings 11 per unit area can be increased in the filter unit 4, thereby achieving an increase in the opening area of the filter unit 4. As a result, in the mesh filter 1 according to the embodiment, a pressure loss in the filter unit 4 can be reduced and the filter performance can be improved as compared with the mesh filter 200 according to the second conventional example in which the rib width (W1) of the longitudinal rib 203 is twice as large as the rib width (W2) of the transverse rib 204.

Other Embodiments

Figure 6A:
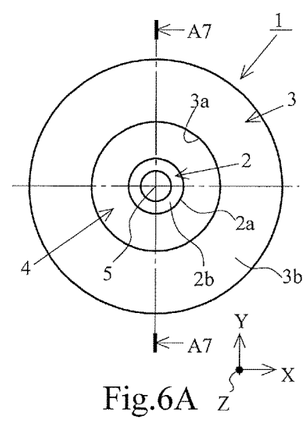
FIG. 6A is a front view illustrating the mesh filter.
Figure 6B:
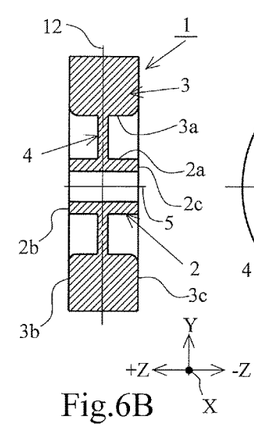
FIG. 6B is a cross sectional view taken along line A7-A7 in FIG. 6A.
Figure 6C:
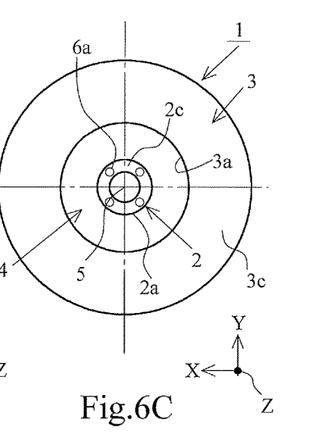
FIG. 6C is a back view of the mesh filter.

Although the gate connection part 2 is formed in a disc shape (discoid) in the mesh filters 1 according to the first and second embodiments, the invention is not limited to those embodiments and the gate connection part 2 may be formed to have a cylindrical shape as illustrated in FIG. 6 (i.e., the width of the gate connection part 2 is the same as the width of the outer cylinder 3). As illustrated in FIG. 6C, a plurality of gates (see the gate mark 6*a*) are formed on the back surface 2*c* of the gate connection part 2.

Although the mesh filter 1 according to the invention is installed in a fuel supply tube connected to the fuel injection apparatus of an automobile in the above examples, the mesh filter 1 may be installed at an intermediate point of an oil conduit of a lubrication apparatus of an automobile or in an oil supply conduit of control oil for a hydraulic control apparatus or the like. The invention is not limited to this example and the mesh filter 1 may be installed in a conduit such as a water supply tube or air supply tube so that foreign matter included in fluid (liquid such as water or gas such as air) can be eliminated in a variety of technical fields.

In addition, the mesh filter 1 according to the invention is not limited to an injection-molded article made of thermoplastic resin and may be an injection-molded article made of heat-hardening resin. The material of the mesh filter 1 may be selected as appropriate according to intended usages and the like.

In addition, in the mesh filters 1 according to the above embodiments, although the longitudinal ribs 8 and the transverse rib 10 cross each other at right angles, the invention is not limited to the embodiments and the longitudinal ribs 8 and the transverse ribs 10 may obliquely cross each other.

In addition, in the mesh filters 1 according to the above embodiments, although the front shape of the outer peripheral surface 2*a* of the gate connection part 2 and the front shape of the inner peripheral surface 3*a* of the outer cylinder 3 are circular, the invention is not limited to the embodiments and one or both of the front shape of the outer peripheral surface 2*a* of the gate connection part 2 and the front shape of the inner peripheral surface 3*a* of the outer cylinder 3 may be polygonal (hexagonal) or the like in consideration of the flowage of molten resin during injection molding and the like.

In addition, in the mesh filters 1 according to the above embodiments, although the wall thickness L8 of the longitudinal rib 8, the wall thickness L9 of the transverse rib 10, and the wall thickness L7 of the filter unit 4 have constant thicknesses from the outer peripheral surface 2*a* of the gate connection part 2 to the inner peripheral surface 3*a* of the outer cylinder 3, the invention is not limited to the embodiments and the wall thicknesses may be changed in consideration of the flowage of molten resin during injection molding and the like.

REFERENCE SIGNS LIST

1: mesh filter
2: gate connection part
2a: outer surface
3: outer cylinder
3a: inner surface
4: filter unit
5: central axis
6: gate
7: metal mold
8: longitudinal rib
10: transverse rib
11: opening
15: cavity
16: first cavity portion (cavity portion)
L2, L3: rib width

The invention claimed is:
1. A mesh filter for filtering out foreign matter in fluid, said mesh filter comprising:
   a discoid gate connection part;
   a cylindrical outer cylinder surrounding the discoid gate connection part; and
   a filter unit connecting an outer peripheral surface of the discoid gate connection part to an inner peripheral surface of the outer cylinder along a radial direction of the discoid gate connection part;
   wherein the filter unit is formed along a virtual X-Y plane orthogonal to a central axis of the gate connection part,
   wherein the filter unit except a connection portion connecting to the discoid gate connection part and a connection portion connecting to the outer cylinder includes a plurality of longitudinal ribs formed at regular intervals parallel to each other along the virtual X-Y plane, a plurality of transverse ribs formed at regular intervals parallel to each other along the X-Y plane, the plurality of transverse ribs crossing the plurality of longitudinal ribs, and a plurality of openings formed between the plurality of longitudinal ribs and the plurality of transverse ribs,
   wherein the discoid gate connection part, the outer cylinder, and the filter unit are formed integrally to have a one-piece construction, rib widths of the longitudinal ribs and rib widths of the transverse ribs are constant, and shapes of the openings are identical, and
   a length of the discoid gate connection part along a central axis of the discoid gate connection part is smaller than a length of the outer cylinder along a central axis of the outer cylinder, and the length of the discoid gate connection part is greater than a length of the filter unit along a central axis of the filter unit.
2. The mesh filter according to claim 1, wherein the rib widths of the longitudinal ribs are equal to the rib widths of the transverse ribs.

* * * * *